3,793,381
PROCESS FOR PURIFYING CYCLOPENTENE
Hans-Dieter Kohler, Dormagen, Herbert Benda, Cologne, and Helmut Scherb, Dormagen, Germany, assignors to Erdolchemie Gesellschaft mit beschrankter Haftung, Cologne, Germany
No Drawing. Filed June 14, 1972, Ser. No. 262,838
Claims priority, application Germany, June 26, 1971, P 21 31 791.9; Jan. 26, 1972, P 22 03 459.9
Int. Cl. C07c 7/04
U.S. Cl. 260—666 A       5 Claims

ABSTRACT OF THE DISCLOSURE

Cyclopentene containing olefinic and diolefinic $C_5$-hydrocarbons as impurities is purified by contacting the impure cyclopentene with a macro porous cation exchanger in the H-form. The purified cyclopentene can be subsequently separated and recovered by distillation.

BACKGROUND

This invention relates to a process for the purification of cyclopentene.

The purity of monomeric cyclopentene has to meet very stringent requirements, for example for the stereospecific polymerization of cyclopentene. Cyclopentene, as it accumulates in the splitting of a $C_5$-hydrocarbon mixture, for example by single-stage or multiple-stage distillation, or by a combination of different methods of separation, for example liquid-liquid extraction, extractive distillation and rectification, contains a number of components as impurities in such a quantity that economic application through direct use of the monomer for polymerization is prevented. Thus, comparison tests have shown that, for example, even where individual components are added to pure cyclopentene for example 20 p.p.m. of methylene cyclobutane or 50 p.p.m. of 3-methyl-1,2-butadiene or 50 p.p.m. of isoprene or 200 p.p.m. of cyclopentadiene or 100 p.p.m. of cis- or trans-1,3-pentadiene, the conversion of the monomer into the polymerized product is greatly reduced or suppressed altogether. Where several of these components are simultaneously present, even in relatively low concentration, they are able in combination to have an adverse effect upon polymerization.

Accordingly, impurities in cyclopentene, for example, isoprene, cyclopentadiene, cis- and trans-1,3-pentadiene, 3-methyl-1,2-butadiene, 1,2-pentadiene and methylene cyclobutane have to be reduced to a content of a few p.p.m. before polymerization. Only a few of the aforementioned components can be separated off by distillation and the cost involved in separation is uneconomically high, in addition to which separation is accompanied by considerable losses of cyclopentene.

SUMMARY

We have now found that cyclopentene containing olefinic and diolefinic $C_5$-hydrocarbons as impurities can readily be purified with considerable economic advantage by contact with a macro porous cation exchanger in the H-form. The purified cyclopentene is preferably subsequently separated off or recovered by distillation.

DESCRIPTION

Macroporous cation exchangers preferably used for the process according to the invention include those containing sulphonic acid groups which are based on styrene-divinyl benzene copolymers and, with particular preference, on styrene-divinyl benzene resins containing sulphonic acid groups having a styrene content of 70 to 90% and a divinyl benzene content of 30 to 10%.

It has proved to be of advantage to use for the process according to the invention macro porous cation exchanger resins which have an average pore diameter of from 5 to 150 m$\mu$, and preferably from 15 to 60 m$\mu$, and having a porosity which generally is in the range of from 0.20 to 0.80 ml. per ml. of ion exchanger beads, and preferably from 0.30 to 0.60 ml. per ml. of ion exchanger beads. The specific surface should generally amount to a value in the range of from 20 to 500 m.$^2$ and preferably to from 40 to 200 m.$^2$ per gram of dry exchanger resin, whilst the grain size should generally be in the range of from 0.1 to 1.8 mm. and more preferably in the range from 0.3 to 1.5 mm.

The porosity of resins such as these can be determined by electron microscopy and mercury porosity measurement (Frevel and Kressley, Anal. Chemie 35, 1492 (1963)), whilst the specific surface is determined from the nitrogen absorption isotherms by the standard method of Brunnauer, Emmet and Teller (BET-method), (J. Amer. Chem. Soc. 59, 310, 1553 (1937), ibid 62, 1732 (1940)).

The macro porous ion exchangers containing sulphonic acid groups which are preferably used for the process according to the invention can be obtained as known per se in accordance with German Pat. No. 1,113,570, and particularly in accordance with Example 3 or Example 4. Corresponding macro porous ion exchangers are also commercially available (for example "Lewatit SP 120," a product of Farbenfabriken Bayer AG.).

Standard commercial cation exchangers in the H-form which are used for the process according to the invention can be directly used for the process providing they are supplied in the anhydrous form.

Ion exchangers in the Na-form have to be converted into the H-form in conventional manner, for example by treatment with 8% sulphuric acid, and then washed with distilled water until they are free from acid.

Water-moist swollen cation exchangers have to be dried before use. Drying is carried out by methods known per se in which the pore cells neither shrink nor collapse during drying, i.e. in which the porosity of the macro porous ion exchanger remains intact. One careful method of drying is for example initially to displace the water from the resin with hydrophilic solvents (for example methanol and acetone) and then to displace the hydrophilic solvent by a hydrocarbon such as, for example, toluene.

By virtue of the process according to the invention, it is possible to purify for example a cyclopentene contaminated by olefinic and diolefinic $C_5$-hydrocarbons of the kind which is formed during the splitting of a $C_5$-hydrocarbon mixture, for example by single-stage or multiple-stage distillation or by a combination of different separation techniques, for example liquid-liquid extraction, extractive distillation and rectification.

Cyclopentene containing isoprene, cyclopentadiene, cis- and trans-1,3-pentadiene, 3-methyl-1,2-butadiene, 1,2-pentadiene and/or methylene cyclobutane as impurities, is particularly suitable for purification by the process according to the invention.

In general, the process according to the invention is carried out in the liquid phase at room temperature, although it can also be carried out at lower or higher temperatures, for example in the range of from 0 to 50° C., optionally under pressure. For example, an increase in the reaction temperature of 20° C. over and above room temperature shortens the necessary residence time by half. In this way, the purity of the cyclopentene can through the temperature.

It has proved to be of particular advantage to carry out the treatment at an elevated temperature, for example at a temperature in the range of from 30 to 80° C., under a pressure of from 1 bar to 10 bars, in which case the possibility of separating off other foreign components, such as carbonyl compounds, in addition to the olefinic and diolefinic $C_5$-hydrocarbons from the impure cyclopentene, is afforded in addition to the advantage of the higher volume-time load of the exchanger resin.

The treatment of cyclopentene to separate off impurities by the process according to the invention can be carried out either continuously or on the batch principle. For example, the process can be carried out as follows:

Using a batch procedure, the dry exchanger resin is admixed with the crude cyclopentene to the purified, preferably in a ratio by weight of 5:100 to 10:100, in a closed glass or stainless-steel vessel, followed by stirring or shaking for about 1 to 6 hours until the content of olefinic and diolefinic $C_5$-hydrocarbons has fallen to the required level. The liquid can then be decanted and, using the same exchanger resin, the reaction vessel filled with more cyclopentene to be purified. In one particular embodiment of the continuous form of the process, the dry cation exchanger is introduced into temperable, stainless steel or glass vessels. It is of advantage to use reaction tubes which can thermostatically be controlled, the height of the exchanger bed amounting to substantially 8 times the diameter of the tube. The stream of cyclopentene is pumped upwards at a constant rate through the externally tempered exchanger bed. By varying the temperature and catalyst load (or residence time), it is possible experimentally to determine the most favorable conditions for the particular starting material by periodically collecting the effluent from the exchanger tube and determining the olefinic and diolefinic impurity content thereof by gas chromatography. The process may have to be carried out under pressure in order to keep it in the liquid phase.

It is known that olefins can be oligomerized in the presence of acid cation exchangers (Erdol and Kohle 19, 497–500 (1966)). In the process according to the invention, cyclopentene itself is surprisingly not affected in any way, even at elevated temperatures, despite the presence of the acid ion exchanger resin. The process enables cyclopentene to be purified without any substantial losses.

The cyclopentene purified by the process according to the invention is used for example as a starting material for the production of polypentenamer by stereospecific polymerization.

The process is illustrated by the following examples. The expression catalyst load $a$ used in the examples is defined by the following quotient:

$$a = \frac{\text{quantity of crude cyclopentene (ml.)}}{\text{quantity of catalyst (ml.) · time (hr.)}}$$

EXAMPLE 1

A macro proous cation exchanger was used which contained sulphonic acid groups in the H-form, obtained by the copolymerization of styrene and divinyl benzene, with a divinyl benzene content of approximately 22%. The ion exchanger had a specific surface of approximately 42.5 m.²/g. and a porosity of 0.32 ml. of pore volume/ml. of ion exchanger.

In batch operation, 7 parts by weight of this resin in dried form were covered under nitrogen with 100 parts by weight of crude cyclopentene in a flask with a ground stopper, after which the vessel was closed and intensively shaken at 20° C. on a shaking machine. In terms of composition (see Table 1), the crude cyclopentane-rich starting material can be regarded as a typical starting material for the recovery of cyclopentene. The balance to 100% by weight is provided by $C_5$- and $C_6$-paraffins and higher hydrocarbons.

TABLE 1

| | Starting product | After 3 hours | After 6 hours |
|---|---|---|---|
| Cyclopentene, percent | 87.7 | 87.9 | 88.0 |
| Cyclopentane, percent | 11.0 | 10.8 | 10.7 |
| Methylene cyclobutane, p.p.m | 530 | 50 | <50 |
| Cis-1,3-pentadiene, p.p.m | 100 | 50 | <50 |
| Trans-1,3-pentadiene, p.p.m | 300 | 140 | 80 |
| Cyclopentadiene, p.p.m | 30 | 15 | 10 |

The results are tabulated in Table 1 from which it can be seen in particular, that the removal of a sample after a reaction time of 3 hours shows a distinct drop in the methylene cyclobutane content; after 6 hours, methylene cyclobutane and cis-1,3-pentadiene are below the gas-chromatography detection limit of 50 p.p.m., whilst the cyclopentadiene content reaches the detection limit of 10 p.p.m.

EXAMPLE 2

A macro porous ion exchanger was prepared in accordance with Example 3 of German Pat. No. 1,113,570. To remove the water present in it, the moist ion exchanger thus obtained was heated to 80–90° C. in a drying cabinet by the conventional drying method. The ion exchanger resin lost substantially 32% of its original volume in the moist state during drying.

Following the batch procedure as in Example 1, 7 parts by weight of the resulting dry macro porous ion exchanger were treated with 100 parts by weight of cyclopentene at 20° C. on a shaking machine.

The composition of the cyclopentene used is shown in Table 2. In this case, too, samples were taken after a reaction time of 3 and 6 hours (Table 2).

TABLE 2

| | Starting material | After 3 hours | After 6 hours |
|---|---|---|---|
| Cyclopentene, percent | 84.7 | 84.8 | 84.9 |
| Cyclopentane, percent | 13.5 | 13.4 | 13.3 |
| Methylene cyclobutane, p.p.m | 990 | 430 | 130 |
| Cis-1,3-pentadiene, p.p.m | 150 | 150 | 120 |
| Trans-1,3-pentadiene, p.p.m | 450 | 430 | 350 |
| 3-methyl-1,2-butadiene, p.p.m | 300 | 260 | 230 |

It was found that, despite the contraction in volume which it undergoes during drying, the ion exchanger shows adequate catalytic activity. The results set out in Table 2 show that, initially, dimerzation of the methylene cyclobutane is highly selective. As the reaction progresses, the pentadienes are clearly affected.

EXAMPLE 3

A macro porous cation exchanger was used which contained sulphonic acid groups in the H-form, obtained by the copolymerization of styrene and divinyl benzene, with a divinyl benzene content of approximately 20%. This ion exchanger had a specific surface of approximately 85 m.²/g., a porosity of approximately 0.5 ml. of pore volume/ml. of ion exchanger and a pore diameter of approximately 55 m$\mu$.

The ion exchanger was dehydrated in conventional manner by azeotropic distillation with benzene. It underwent a contraction in volume of substantially 24% during drying.

A jacketed glass column (3.4 cm. diameter) was filled under a nitrogen atmosphere with approximately 250 cc. of this ion exchanger. The internal temperature of the column was maintained at 40° C. by thermostatic control of the outer jacket.

Cyclopentene having the composition shown in Table 3 was passed upwards through this column filled with the ion exchanger at a constant rate of 500 ml. per hour (corresponding to a catalyst load $a=2$). A sample was taken after 6 hours, the composition shown in Table 3 being determined by analysis using gas chromatography.

TABLE 3

| | Starting material | End product after 6 hours |
|---|---|---|
| Cyclopentene, percent | 95.7 | 92.2 |
| Cyclopentane, percent | 4.1 | 4.1 |
| Methylene cyclobutane, p.p.m. | 200 | <50 |
| Cis-1,3-pentadiene, p.p.m. | 660 | 110 |
| Trans-1,3-pentadiene, p.p.m. | 280 | <50 |
| Cyclopentadiene, p.p.m. | 50 | <10 |
| Isoprene, p.p.m. | 75 | <10 |

As can be seen from this table, methylene cyclobutane and trans-1,3-pentadiene were reduced to below the detection limit of 50 p.p.m., whilst the cyclopentadiene and isoprene contents actually fell to less than 10 p.p.m.

EXAMPLE 4

A glass column with an internal diameter of 5 cm. having an outer jacket which can be tempered through a thermostat was filled under a nitrogen atmosphere with 1000 ml. of the macro porous ion exchanger described in Example 1. Cyclopentene with the same composition as in Example 1 was passed upwards with varying catalyst load through the exchanger bed. The temperature of the column was maintained at 20° C. by a thermostat. The removal of a sample for analyzing the end product by gas chromatography was carried out after 4 hours of constant catalyst load. The composition of the product at the individual catalyst loads is set out in Table 4.

TABLE 4

| $a$ | Starting material | $a=3$ | $a=2$ | $a=1.5$ | $a=1$ |
|---|---|---|---|---|---|
| Cyclopentene, percent | 87.7 | 87.7 | 87.8 | 88.0 | 88.1 |
| Cyclopentane, percent | 11.0 | 10.9 | 10.9 | 10.8 | 10.8 |
| Methylene cyclobutane, p.p.m. | 530 | 50 | <50 | <50 | <50 |
| Cis-1,3-pentadiene, p.p.m. | 100 | <50 | <50 | <50 | <50 |
| Trans-1,3-pentadiene, p.p.m. | 300 | 110 | 75 | 70 | <50 |
| Cyclopentadiene, p.p.m. | 30 | 10 | <10 | <10 | <10 |
| Carbonyls (det. as $CH_3CHO$), p.p.m. | 163 | | 157 | | 150 |

Table 4 shows that, even at the very high catalyst load $a=3$, the concentrations of methylene cyclobutane and of cyclopentadiene reach the detection limit of 50 p.p.m. and 10 p.p.m., respectively. At the same time, the pentadiene content falls to less than half the starting concentration.

EXAMPLE 5

The tests were carried out in the same way as in Example 4, but at a constant internal temperature of the column of 40° C. This slight increase in temperature was sufficient to obtain values below the detection limit of 50 p.p.m. for the methylene cyclobutane and cis-pentadient contents, even at a catalyst load of $a=4$. The cyclopentadiene content fell to less than 10 p.p.m. The results for different catalyst loads are set out in Table 5.

TABLE 5

| $a$ | Starting material | $a=4$ | $a=3$ | $a=2$ | $a=1.5$ | $a=1$ |
|---|---|---|---|---|---|---|
| Cyclopentene, percent | 87.7 | 87.7 | 87.8 | 87.8 | 87.9 | 87.9 |
| Cyclopentane, percent | 11.0 | 11.0 | 10.9 | 10.8 | 10.8 | 10.8 |
| Methylene cyclobutane, p.p.m. | 530 | <50 | <50 | <50 | <50 | <50 |
| Cis-1,3-pentadiene, p.p.m. | 100 | <50 | <50 | <50 | <50 | <50 |
| Trans-1,3-pentadiene, p.p.m. | 300 | 85 | <50 | <50 | <50 | <50 |
| Cyclopentadiene, p.p.m. | 30 | <10 | <10 | <10 | <10 | <10 |
| Carbonyls (det. as $CH_3CHO$), p.p.m. | 163 | 128 | | 90 | | 88 |

EXAMPLE 6

A double-jacketed temperable tube of stainless steel with an internal diameter of 6 cm. is filled under a nitrogen atmosphere with 2000 ml. of a macro porous ion exchanger containing sulphonic acid groups in the H-form.

An ion exchanger obtained by the copolymerization of styrene and divinyl benzene with a divinyl benzene content of approximately 20% was used. This ion exchanger had an average pore diameter of around 130 mµ and a specific surface of approximately 45 m.²/g. The ion exchanger, which was in the Na-form, was initially converted into the H-form in the conventional way with 8% sulphuric acid and then washed with demineralized water until it was free from acid. Thereafter, the water was removed from the moist ion exchanger with 3 times its volume of menthanol and the methanol subsequently washed out by repeated rinsing with toluene. The resin was used in a toluene-moist form.

Crude cyclopentene with an unusually high 1,3-pentadiene content of 5900 p.p.m. (cis- and trans- together), and relatively high contents of methylene cyclobutane, cyclopentadiene and 3-methyl-1,2-butadiene, was treated at 20° C. (composition, see Table 6). The balance to 100% by weight was provided by cyclopentene and other $C_5$- and $C_6$-paraffins.

The starting material was passed through the exchanger bed in an upward stream with different catalyst loads, each sample being taken after 4 hours at constant catalyst load. The results for different catalyst loads are set out in Table 6.

TABLE 6

| $a$ | Starting material | $a=2$ | $a=1$ | $a=0.66$ |
|---|---|---|---|---|
| Cyclopentene, percent | 97.6 | 97.7 | 97.6 | 97.8 |
| Methylene cyclobutane, p.p.m. | 1,800 | 1,700 | 1,020 | 190 |
| 1,3-pentadiene (cis plus trans), p.p.m. | 5,900 | 5,700 | 5,070 | 4,010 |
| 3-methyl-1,2-butadiene, p.p.m. | 670 | 620 | 620 | 540 |
| Cyclopentadiene, p.p.m. | 700 | 470 | 420 | 400 |

The preferential reaction of the methylene cyclobutane which occurs with a suffiiently long reaction time (low catalyst load) at room temperature can be seen particularly clearly in this example (cf. Example 2 as well).

EXAMPLE 7

The test was carried out as in Example 6 with the same starting material, except that the tube was brought to an internal temperature of 40° C. by heating the outer jacket by means of a thermostat.

TABLE 7

| $a$ | Starting material | $a=2$ | $a=1$ | $a=0.66$ |
|---|---|---|---|---|
| Cyclopentene, percent | 97.6 | 97.7 | 97.8 | 97.9 |
| Methylene cyclobutane, p.p.m. | 1,800 | 860 | <50 | <50 |
| 1,3-pentadiene (cis plus trans), p.p.m. | 5,900 | 5,550 | 2,880 | <100 |
| 3-methyl-1,2-butadiene, p.p.m. | 670 | 640 | 400 | 75 |
| Cyclopentadiene, p.p.m. | 700 | 400 | 100 | <10 |

EXAMPLE 8

After two-stage distillation, a crude cyclopentene, obtained by splitting dicyclopentadiene and hydrogenating the cyclopentadiene formed, contains inter alia 1250 p.p.m. of cyclopentadiene (composition see Table 8). The material was purified on an pilot plant scale by treatment with a macro porous ion exchanger prepared in accordance with Example 4 of German Pat. No. 1,113,570. The ion exchanger resin was dried as in Example 6 by displacing the water with methanol and toluene.

To carry out the test, a stainless steel tube (14 cm. internal diameter) with a temperable outer jacket was filled under nitrogen with 16 litres of the toluene-moist resin. Crude cyclopentene was passed upwards through the exchanger bed at a constant rate of 27 litres per hour at different internal temperatures (catalyst load $a=1.7$). The tests were carried out at 18, 32, 35 and 38° C. After runs of 5 hours each at constant catalyst load and temperature, a sample of the cyclopentene effluent was analyzed by gas chromatography. The results are set out in Table 8.

TABLE 8

[Catalyst load a=1.7]

| | Starting material | T=18° C. | T=32° C. | T=35° C. | T=38° C. |
|---|---|---|---|---|---|
| Cyclopentene, percent | 95.7 | 95.7 | 95.6 | 95.5 | 93.4 |
| Cyclopentane, percent | 4.1 | 4.1 | 4.1 | 4.1 | 4.2 |
| Cyclopentadiene, p.p.m. | 1,250 | 480 | 150 | 50 | <10 |
| 2-methyl-2-butene, p.p.m. | 140 | 110 | 70 | 60 | <50 |
| Cis-1,3-pentadiene, p.p.m. | 170 | 100 | 50 | <50 | <50 |

Under suitable temperature conditions, not only did the cyclopentadiene content fall below the detection limit of 10 p.p.m., even the 2-methyl-2-butene which is hardly affected at all by acid reagents was reduced to a content of less than 50 p.p.m., as was the cis-1,3-pentadiene.

What is claimed is:

1. Process for purifying cyclopentene containing olefinic and diolefinic $C_5$-hydrocarbons as impurities, which comprises contacting the cyclopentene to be purified in the liquid phase at temperatures of from 0 to 80° C. with a macro porous cation exchanger in the H-form having an average pore diameter of from 5 to 150 m$\mu$ and a porosity in the range of 0.20 to 0.80 ml. per ml. of cation exchanger.

2. Process of claim 1 wherein the purified cyclopentene is separated by distillation.

3. Process of claim 1 wherein the macro porous cation exchangers used are cross-linked cation exchangers containing sulphonic acid groups which are based on copolymers of styrene and divinyl benzene.

4. Process of claim 3 wherein the divinyl benzene content is from 10 to 30%.

5. Process of claim 1 wherein contact of the impure cyclopentene is carried out under pressures of 1 to 10 bars.

References Cited

UNITED STATES PATENTS

| 3,219,717 | 11/1965 | Niles | 260—666 A |
| 2,839,569 | 6/1958 | Kramer | 252—426 |
| 3,405,178 | 10/1968 | Wöllner et al. | 252—430 |
| 3,442,954 | 5/1969 | Crocker et al. | 252—431 R |
| 3,574,763 | 4/1971 | Wöllner | 252—430 |
| 2,783,212 | 2/1957 | Schnell | 252—426 |

FOREIGN PATENTS

| 1,113,570 | 9/1961 | Germany | 260—666 |

DELBERT E. GANTZ, Primary Examiner

V. O'KEEFE, Assistant Examiner

U.S. Cl. X.R.

260—666 F Y; 252—426, 430, 431 R

UNITED STATES PATENT OFFICE
CERTIFICATE OF CORRECTION

Patent No. 3,793,381                   Dated February 19,1974

Inventor(s) Hans-Dieter Kohler, et al.

It is certified that error appears in the above-identified patent and that said Letters Patent are hereby corrected as shown below:

Column 2, line 66, after "can" insert --be controlled both through residence time and also--;

Column 3, line 58        "proous" should read --porous--;

Column 5, line 52        "pentadient" should read --pentadiene--;

Column 6, line 9         "menthanol" should read --methanol--.

Signed and sealed this 17th day of September 1974.

(SEAL)
Attest:

McCOY M. GIBSON JR.
Attesting Officer

C. MARSHALL DANN
Commissioner of Patents